United States Patent Office 2,939,216
Patented June 7, 1960

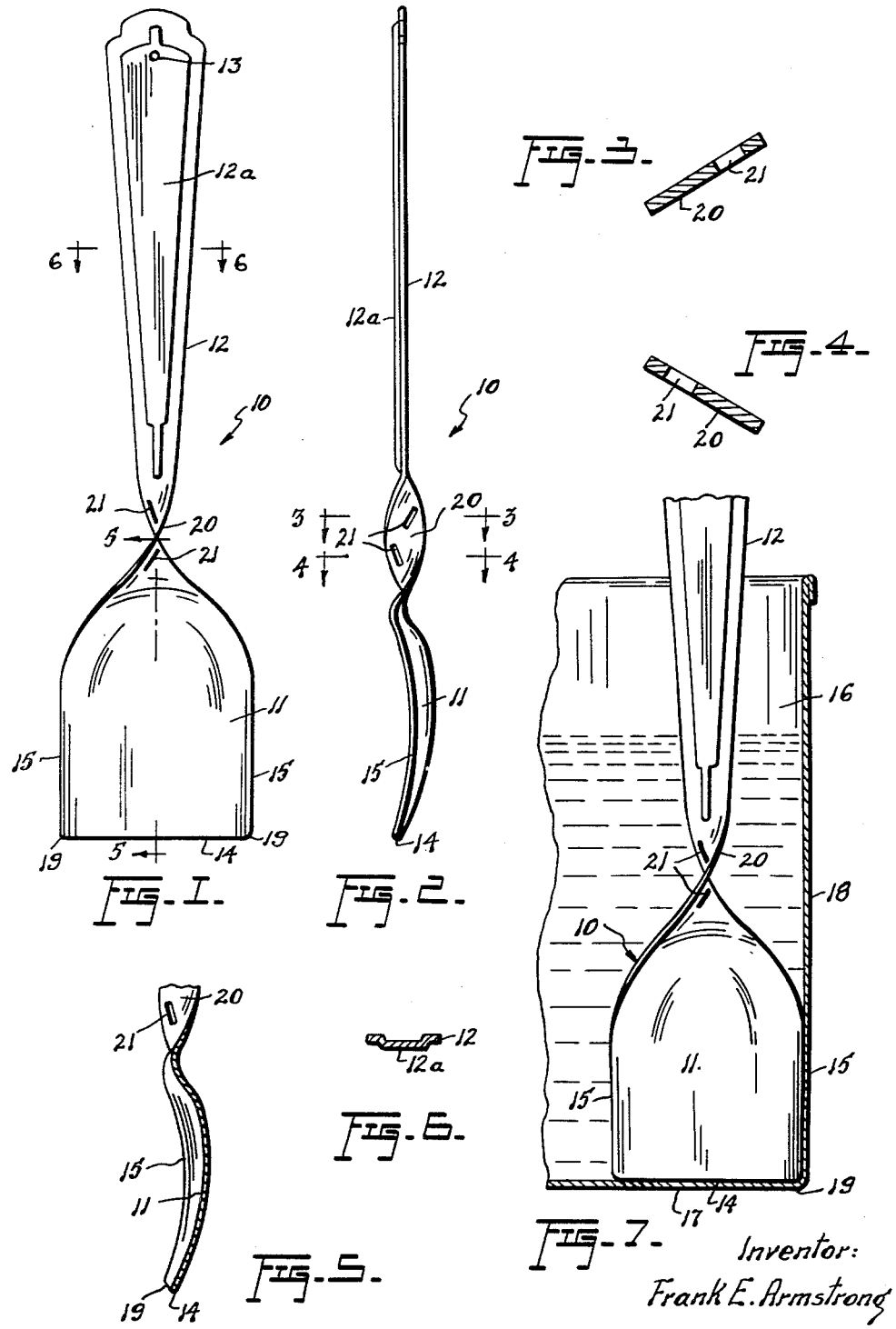
June 7, 1960     F. E. ARMSTRONG     2,939,216
STIRRING SPOONS
Filed Nov. 10, 1958
Inventor:
Frank E. Armstrong

2,939,216

STIRRING SPOONS

Frank E. Armstrong, Landover, Md.

Filed Nov. 10, 1958, Ser. No. 773,089

3 Claims. (Cl. 30—324)

This invention relates to new and useful improvements in stirring spoons, and the principal object of the invention is to provide a stirring spoon of the character herein described which is capable of properly stirring and agitating the contents of a cooking utensil, without leaving some portions of such contents undisturbed.

As is well known, culinary utensils such as pots have a flat bottom and straight sides, and conventional spoons used for stirring the contents of such utensils have an oval shaped bowl. Consequently, the curved edge of the bowl of such spoons can engage the flat bottom and straight sides of the utensil only at one or two points of contact, namely, at one point of contact between the curved bottom edge of the spoon and the flat bottom of the utensil and at a second point of contact between the curved side edge of the spoon and the straight side of the utensil, whereby the stirring operation is not only a tedious task, but is also very inefficient inasmuch as substantial portions of the contents of the utensil remain unstirred, especially those portions along the outer region of the bottom and lower regions of the sides where the junction of the sides with the bottom prevents effective manipulation of the spoon.

The invention eliminates this difficulty by the provision of a stirring spoon having a bowl which is provided with a straight bottom edge and with straight side edge portions, the same being adapted to engage, along their entire length, the flat bottom and straight sides of a cooking utensil, so that the contents are properly stirred when the spoon is manipulated.

Another important feature of the invention resides in providing a portion of the handle of the spoon adjacent the bowl with a set of openings which form passages for the material being stirred, the above mentioned handle portion being axially twisted and disposed angularly relative to the plane of the bowl, whereby during manipulation of the spoon the flow of material through the angularly oriented passages not only promotes agitation of such material, but also assists in dissipation of heat conducted from the bowl to the handle of the spoon, so that the handle remains comparatively cool when the spoon is used for stirring purposes while the contents of the utensil are hot.

Some of the advantages of the invention reside in its extreme simplicity of construction, in its efficient operation, and in its adaptability to economical manufacture.

With the foregoing more important objects and features in view and such other objects and features as may become apparent as this specification proceeds, the invention will be understood from the following description taken in conjunction with the accompanying drawings, wherein like characters of reference are used to designate like parts, and wherein:

Figure 1 is an elevational view of a stirring spoon in accordance with the invention;

Figure 2 is a side edge view thereof;

Figure 3 is a sectional detail on an enlarged scale, taken in the plane of the line 3—3 in Figure 2;

Figure 4 is a sectional detail on an enlarged scale, taken in the plane of the line 4—4 in Figure 2;

Figure 5 is a fragmentary sectional view, taken substantially in the plane of the line 5—5 in Figure 1;

Figure 6 is a sectional detail, taken in the plane of the plane of the line 6—6 in Figure 1; and Figure 7 is a fragmentary vertical sectional view of a a cooking utensil, showing the stirring spoon in situ therein.

Referring now to the accompanying drawings in detail, the stirring spoon in accordance with the invention is designated generally by the reference numeral 10 and comprises a bowl 11 together with an elongated handle 12 which is formed integrally with the bowl in the usual manner. The handle 12 is preferably formed with a raised portion 12a which extends longitudinally thereon for purposes of reinforcement as well as for purposes of ornamentation, as is customary in the art. Also, the upper end portion of the handle may be provided with an aperture 13, whereby the entire spoon may be suspended from a suitable hanger, when it is not in use.

While bowls of conventional spoons are oval shaped, the essence of novelty of the invention resides in forming the bowl 11 so that it has a straight bottom edge 14 and a pair of straight side edge portions 15, so that when the spoon is placed in use for stirring the contents of a conventional utensil 16 as shown in Figure 7, the straight bottom edge 14 of the spoon engages along its entire length the usual flat bottom 17 of the utensil, while one of the straight side edge portions 15 of the spoon similarly engages along its entire length the usual straight side wall 18 of the utensil. Thus, the contact of the spoon with the utensil is along lines rather than at mere points, and the contents of the utensil may be efficiently stirred without leaving portions of the contents undisturbed.

Since the side wall 18 of the utensil 16 usually joins the bottom 17 with a slight curvature rather than at a sharp angle, the corners of the bowl 11 at the junctions of the side edge portions 15 with the bottom edge 14 are curved or rounded as indicated at 19, thus affording proper fitting of the spoon to the interior of the utensil, as will be readily apparent.

The portion 20 of the handle 12 adjacent the bowl 11 is axially twisted and disposed angularly relative to the plane of the bowl and is provided with a set of spaced openings in the form of slots 21 which, by virtue of the angular disposition of the handle portion 20, are also angularly oriented relative to the plane of the bowl. These openings or slots 21 function as passages for material in the utensil 16, so that when the spoon is manipulated in the usual manner, the angularly oriented passages will effectively promote the agitation of the material in the utensil. Moreover, in instances where the contents of the utensil are hot while being stirred, the openings 21 will effectively assist in the dissipation of heat conducted from the bowl of the spoon to the handle, so that the handle remains comparatively cool.

While in the foregoing there has been shown and described the preferred embodiment of the invention, various modifications may become apparent to those skilled in the art to which the invention relates. Accordingly, it is not desired to limit the invention to this disclosure, and various modifications may be resorted to, such as may lie within the spirit and scope of the appended claims.

What is claimed as new is:

1. A stirring spoon comprising a bowl and a handle thereon, said bowl having a straight bottom edge and straight side edge portions perpendicular to said bottom edge whereby the bottom edge and the side edge portions are adapted to engage along their entire length the flat bottom and straight sides respectively of a cooking utensil, a portion of said handle adjacent said bowl being axially twisted and disposed angularly relative to the plane of said bowl, said portion of the handle being provided with a set of spaced openings forming passages for material being stirred, whereby to promote agitation of the stated material and assist in dissipation of heat conducted from said bowl to said handle.

2. The device as defined in claim 1 wherein said openings are elongated into the form of slots.

3. The device as defined in claim 1 wherein said openings are spaced in said axially twisted portion of said handle and are oriented at relatively different angularities to the plane of said bowl.

References Cited in the file of this patent

UNITED STATES PATENTS

| D. 152,438 | Skrastin | Jan. 18, 1949 |
| D. 168,335 | Cosby | Dec. 9, 1952 |
| 339,514 | Averill | Apr. 6, 1886 |
| 944,091 | Harn | Dec. 21, 1909 |
| 1,211,062 | Bowman | Jan. 2, 1917 |
| 2,364,339 | Becker | Dec. 5, 1944 |
| 2,561,374 | Igoe | July 24, 1951 |
| 2,634,497 | Waldesbuehl | Apr. 14, 1953 |